Nov. 26, 1935.  J. H. LONSKEY  2,022,292
AUTOMOBILE HEATER
Filed Sept. 24, 1934   2 Sheets-Sheet 1
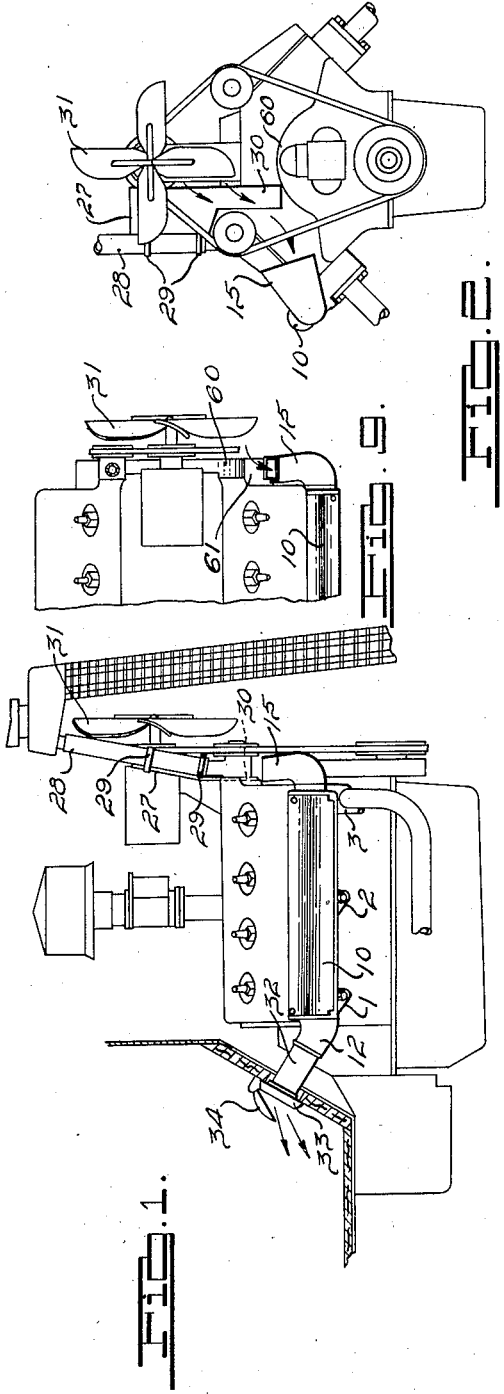
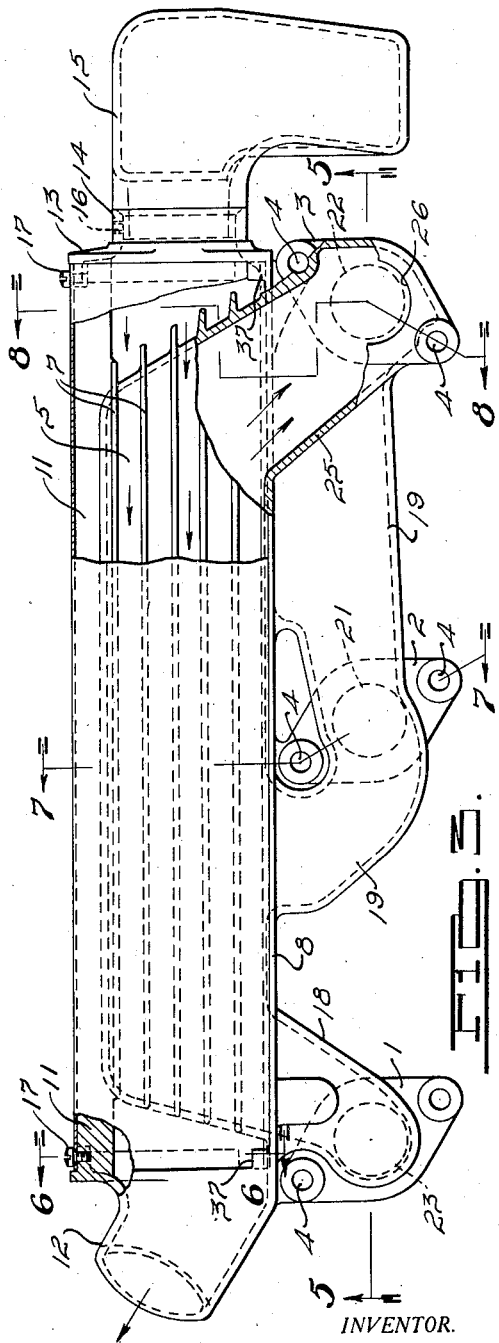
INVENTOR.
John H. Lonskey.
BY
Charles E. Wisner
ATTORNEY.

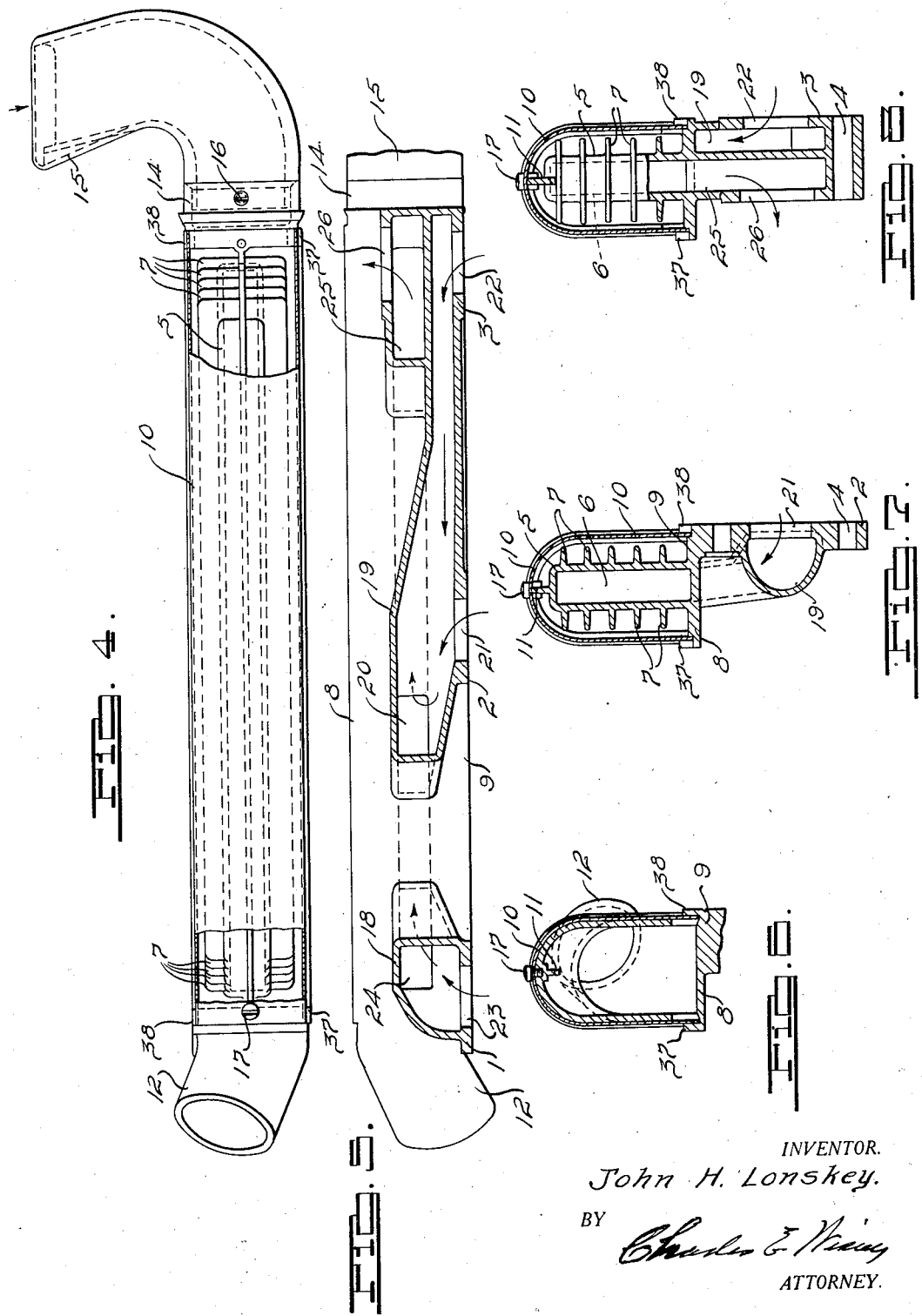

Patented Nov. 26, 1935

2,022,292

UNITED STATES PATENT OFFICE 2,022,292

AUTOMOBILE HEATER

John H. Lonskey, Ypsilanti, Mich., assignor to Central Specialty Company, Ypsilanti, Mich., a corporation of Michigan Application September 24, 1934, Serial No. 745,207

8 Claims. (Cl. 257—241)

This invention relates to automobile heaters and the object of the invention is to provide an automobile heater of the hot air type which is heated by the exhaust gases of the automobile engine.

Another object of the invention is to provide an automobile heater comprising an exhaust manifold arranged to be mounted over the exhaust ports of an automobile engine and provided with longitudinal ribs for dissipation of heat, a cover being provided over the ribbed portion through which fresh air is blown by the engine cooling fan into the automobile body.

A further object of the invention is to provide an automobile heater in which the exhaust gases from the automobile engine are made to pass through the length of the ribbed portion of the exhaust manifold before being discharged through the exhaust pipe.

Another object of the invention is to provide an automobile heater having a longitudinally ribbed manifold and provided with a U-shaped sheet metal cover through which air may be blown into the interior of the car, the cover being removable during the summer to allow the heat to be dissipated to the atmosphere through the ribbed portion.

A further object of the invention is to provide a means for deflecting fresh air from the periphery of the automobile fan into the heater so that it may be forced through the heater into the passenger compartment.

One of the primary features and objects of the invention is to provide a heater for association with the exhaust manifold of an internal combustion engine wherein the body of the heater extends along the side of the engine and has an open forward end extending approximately at a right angle to the body and overlying the forward end of the engine block whereby the air driven by the cooling fan against the engine block is caused to enter the said open end. Preferably also the said inturned or inbent end is in rotatable relation to the body of the air conduit.

These objects and the several novel features of the invention are hereinafter more fully described and claimed and the preferred form of construction of an automobile heater by which these objects are attained is shown in the accompanying drawings in which—

Fig. 1 is a side elevation of an automobile engine showing my improved heater and air deflector mounted thereon.

Fig. 2 is a front elevation of the engine with the heater and air deflector mounted thereon.

Fig. 3 is an enlarged elevation of the heater and exhaust manifold partially broken away to show the construction.

Fig. 4 is a plan view of the heater and manifold partially broken away to show the construction.

Fig. 5 is a section taken on line 5—5 of Fig. 3.

Fig. 6 is a section taken on line 6—6 of Fig. 3.

Fig. 7 is a section taken on line 7—7 of Fig. 3.

Fig. 8 is a section taken on line 8—8 of Fig. 3.

Fig. 9 is a diagrammatic plan view of the engine block showing the position of the funnel end of the heater and face of the engine block.

The heater shown in the drawings was designed particularly for a V—8 engine of a well known inexpensive make and this engine is of a standard type having three exhaust ports in each four cylinder block. For this reason the exhaust manifold casting is provided with three plates 1, 2, and 3 shaped to fit over the exhaust ports and provided with apertures 4 through which the cylinder block studs may extend for fastening the exhaust manifold casting in place. The exhaust manifold casting 5, as shown more particularly in Figs. 3, 7, and 8, is provided with a high narrow conduit 6 and this conduit is provided with integral ribs 7 to increase heat radiation.

This casting 5 is provided with integral flanges 8 and 9 below the ribs 7 which extend beyond the outer edges of the ribs 7 and provide seats for the opposite edges of the inverted U-shaped sheet metal housing 10, as shown in Figs. 3, 4, 5, and 7. This sheet metal housing 10 rests on the vertical rib 11 at the top of the casting 5. This rib 11 extends beyond the opposite ends of the casting 5 and, as shown in Figs. 3, 4, and 6, the rib connects at one end with the discharge conduit 12 for the hot air which is spaced from the end of the casting portion 5 and is connected thereto at the top by the rib 11 and at the bottom by the flanges 8 and 9, as will be understood from Fig. 6. At the opposite end, the rib 11 is connected to the top of the portion 13 of the casting which is provided with a collar 14 in which the end of the inlet mouthpiece 15 is mounted and secured by the screw 16 shown in Fig. 4.

The sheet metal cover is secured in place by means of two screws 17 which are threaded into bosses formed on the opposite ends of the rib 11. At the opposite ends, the sheet metal housing 10 is engaged behind lugs 37 and 38 provided on the flanges 8 and 9 of the casting 5, as shown in Figs. 3, 4, 6, and 7. The casting 5 below the flanges 8 and 9 is provided with an exhaust gas conduit 18, shown in Figs. 3 and 5, which connects the interior of the casting 5 with the first exhaust port through the plate 1. A second conduit 19 is provided opening downwardly from the aperture 20 in the manifold 5 and connects the apertures 21 and 22 of the plates 2 and 3 with the exhaust manifold 5, as will be understood more particularly from Figs. 3, 5, 7, and 8.

It will thus be noted that the exhaust gases passing through the apertures 21 and 22 must pass through the length of the conduit 19 and through the aperture 20 into the chamber 6 of the casting 5, while the exhaust gases passing through the aperture 23 of the plate 1 passes through the conduit 18 and through the aperture 24 into the chamber 6 of the casting 5. The gases then pass through the length of the chamber 6 and are discharged downwardly through the conduit 25 shown in Fig. 3 and outwardly through the aperture 26 shown in Fig. 8. The exhaust pipe is connected over the aperture 26 by means of a flanged coupling so that the gases are carried away from the heater through the usual exhaust pipe.

In operation, the screw 16 is loosened to allow the mouthpiece 15 to be turned to the desired position, as shown in Fig. 2 at which time, the screw 16 is tightened to secure the mouthpiece in place. In order to deflect air to this mouthpiece, a baffle plate 27 shown in Figs. 1 and 2 is attached to the hose connection 28 between the engine and the radiator by means of clamps 29. This baffle plate is provided with an end 30 extending downwardly at the front of the engine and with this baffle plate in place the air currents produced by the engine fan 31 are deflected downwardly from the periphery of the fan into the air inlet mouthpiece 15 of the heater. The air flows through this mouthpiece into the sheet metal housing 10, as will be understood from Figs. 3, 4, 7, and 8 and the air passes between the housing 10 and the longitudinal fins 7 of the exhaust manifold from which it is discharged through the hot air outlet 12.

This outlet 12, as shown in Fig. 1, is provided with a flexible hose connection 32 to the outlet 33 which is provided with a cover 34 within the automobile body. This arrangement insures clean heated air being delivered into the interior of the automobile body and it will be noted that the exhaust gases are caused to pass through the manifold casting 5 in the opposite direction to the flow of air on the exterior of the casting and this arrangement assists in radiating heat to the air passing through the housing 10.

One of the advantages of this heater is that the screws 17 may be removed allowing removal of the U-shaped housing 10 for summer driving, at which time, the air flow may take place all about the ribbed casting 5 and insure proper dissipation of heat from the exhaust manifold even at high summer temperatures without any of the heat passing into the automobile body.

The foregoing description includes the baffle plate 27 but the baffle is not a vitally necessary adjunct as it will be observed from Figs. 2 and 9 that the air stream from the blades will strike the end of the engine block and pass into the mouthpiece 15 of the manifold. In the V type engine, which is the type here illustrated, there is usually a forwardly projecting portion 60 of the engine block and this forms a recessed portion 61 in the forward face of the engine block and it is in this recess that the funnel end 15 of the heater is positioned. Thus the air stream, which is indicated by the arrows in Fig. 9, is caused to be deflected directly into the funnel. Thus the invention is not confined to the use of a baffle member.

From the foregoing description it becomes evident that the device is very simple and efficient in operation, will not easily get out of order, may be quickly rearranged for summer or winter driving and provides a device which accomplishes the objects described.

Having thus fully described my invention, its utility and mode of operation, what I claim and desire to secure by Letters Patent of the United States is—

1. The combination with an automobile engine having a cooling fan mounted thereabove, an exhaust manifold having a ribbed portion and provided with a flange on each side, a housing enclosing the ribbed portion and seating on said flanges, the housing being provided with an inlet at one end and an outlet at the opposite end, a funnel-shaped member adjustably mounted in the inlet and being turnable toward the periphery of the engine fan and a baffle plate mounted on the top of the engine behind the fan, said baffle plate being arranged to direct a portion of the air stream from the periphery of the fan toward said funnel-shaped member.

2. The combination with an automobile engine having a cooling fan, an exhaust manifold, a housing mounted on the manifold and extending in spaced relation therewith, an air inlet at one end of the housing, a funnel-shaped member connected to the inlet and opening toward the engine fan, a baffle mounted on the engine behind the fan, said baffle being arranged to direct a portion of the air stream from the fan periphery into the funnel-shaped member.

3. An automobile heater for association with an internal combustion engine having an exhaust manifold, comprising an air conduit associated with the exhaust manifold whereby air passing therethrough is heated, the forward open end of the conduit extending at an angle to the longitudinal axis thereof in close contact with the forward end of the engine block, and a cooling fan associated therewith whereby a stream of air is forced against the block and deflected thereby into the said forward end of the air conduit.

4. An automobile heater for association with the exhaust manifold of an internal combustion engine, comprising an air conduit having a portion extending along the side of the engine and associated with the exhaust manifold in such manner that air passing through the conduit is heated, said air conduit having a portion thereof extending to the body of the automobile and an L shaped member at the forward end of the conduit, one leg thereof being rotatably adjustable to permit the open end thereof to be turned to any desired radial position and the other leg thereof overlying the forward end of the engine block, and a cooling fan associated with the engine whereby air driven against the engine block is discharged into the said open end of the L shaped member.

5. An automobile heater for association with an internal combustion engine of the V type having an exhaust manifold and a cooling fan, the forward end of the block having a central projecting portion and side portions extending in a plane parallel with and to the rear of the face of the projecting portion, a heater comprising an air conduit having a portion thereof lying along the side of the engine block and enclosing a portion of the exhaust manifold whereby air may be heated in passing through the air conduit, said air conduit further having an inturned open end portion lying approximately in contact with the face of the engine block on one side adjacent the said projecting conduit portion with the open end thereof facing the side of the central projecting portion whereby the air stream driven against the face of the block and the said recess by the fan is deflected into the said open end of the air conduit.

6. The combination with an automobile engine having a cooling fan at the forward end positioned to direct a portion of its air stream against the end face of the engine, of an exhaust manifold having a ribbed portion and provided with a flange on each side, a housing enclosing the ribbed portion and seating on said flanges, the housing being provided with an inlet adjacent the forward end of the engine and an outlet at the opposite end, a funnel-shaped member mounted in the inlet and having an open mouth extending over the forward end face of the engine and in close proximity therewith, the arrangement being such that the air stream flowing over the end face of the engine is directed into the mouth of the funnel-shaped member.

7. An automobile heater for asociation with an internal combustion engine having an exhaust manifold, comprising an air conduit associated with the exhaust manifold whereby air passing through the conduit is heated, the forward end of the conduit extending at an angle to the longitudinal axis thereof in approximate contact with the forward end of the engine block, and a fan above and forward of the said open end of the air conduit for driving air against the end of the engine block and deflected thereby into the said forward open end of the air conduit.

8. The combination with an automobile engine having a cooling fan at the forward end positioned to direct a portion of its air stream against the end face of the engine, of an exhaust manifold having a ribbed portion and provided with a flange on each side, a housing enclosing the ribbed portion and seating on said flanges, the housing being provided with an inlet adjacent the forward end of the engine and an outlet at the opposite end, a funnel-shaped member rotatably mounted in the inlet and having an open mouth turnable to position over the forward end face of the engine and in close proximity therewith, the arrangement being such that the funnel-shaped member may be turned and adjusted to receive the air stream flowing over the end face of the engine from the cooling fan.

JOHN H. LONSKEY.